US009071773B2

(12) United States Patent
Oka

(10) Patent No.: US 9,071,773 B2
(45) Date of Patent: Jun. 30, 2015

(54) PROJECTION SYSTEM

(75) Inventor: Nobuhiro Oka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 13/108,628

(22) Filed: May 16, 2011

(65) Prior Publication Data

US 2011/0292080 A1   Dec. 1, 2011

(30) Foreign Application Priority Data

May 26, 2010   (JP) ................... 2010-121012

(51) Int. Cl.
| G09G 5/377 | (2006.01) |
| H04N 9/31 | (2006.01) |
| H04N 1/00 | (2006.01) |
| G06F 3/14 | (2006.01) |
| H04N 5/445 | (2011.01) |
| H04N 21/41 | (2011.01) |
| H04N 21/485 | (2011.01) |

(52) U.S. Cl.
CPC ......... *H04N 9/3197* (2013.01); *H04N 1/00249* (2013.01); *G09G 5/377* (2013.01); *G06F 3/1446* (2013.01); *G09G 2320/0606* (2013.01); *G09G 2320/08* (2013.01); *G09G 2340/0464* (2013.01); *G09G 2340/12* (2013.01); *G09G 2370/06* (2013.01); *H04N 5/44504* (2013.01); *H04N 9/3147* (2013.01); *H04N 9/3179* (2013.01); *H04N 21/4122* (2013.01); *H04N 21/4854* (2013.01)

(58) Field of Classification Search
USPC ........................................... 353/31; 345/661
See application file for complete search history.

(56) References Cited

U.S. PATENT DOCUMENTS

| 6,829,664 | B2 | 12/2004 | Nomizo |
| 6,840,625 | B2 | 1/2005 | Koyama |
| 7,061,476 | B2 | 6/2006 | Fujiwara |
| 8,529,069 | B2 | 9/2013 | Oka |
| 2001/0013843 | A1* | 8/2001 | Fujiwara et al. ............... 345/1.2 |
| 2002/0021259 | A1 | 2/2002 | Itaki |
| 2002/0159035 | A1* | 10/2002 | Koyama et al. ................. 353/31 |
| 2003/0126326 | A1 | 7/2003 | Nomizo |
| 2005/0116968 | A1* | 6/2005 | Barrus et al. .................. 345/698 |

(Continued)

FOREIGN PATENT DOCUMENTS

| JP | 2000-338941 A | 12/2000 |
| JP | 2001-272723 A | 10/2001 |

(Continued)

*Primary Examiner* — Phi Hoang
(74) *Attorney, Agent, or Firm* — Canon USA, Inc., IP Division

(57) ABSTRACT

A projection apparatus includes a communication unit, an obtaining unit, a projection unit, a generator, and a controller. The communication unit communicates with an other projection apparatus. The obtaining unit obtains image data and the projection unit projects an image based on the image data obtained by the obtaining unit. The generator generates an on-screen-display (OSD) image. The controller controls the projection unit to project a projection image by superimposing the OSD image onto an image, based on the image data obtained by the obtaining unit, in a stack projection mode in which a projection image of the projection unit and a projection image of the other projection apparatus are projected to be superimposed with each other, and to transmit, to the other projection apparatus, information concerning a position at which the OSD image is superimposed.

27 Claims, 11 Drawing Sheets

(56) References Cited

U.S. PATENT DOCUMENTS

| | | | |
|---|---|---|---|
| 2005/0179874 A1* | 8/2005 | Miyazawa | 353/94 |
| 2007/0052733 A1* | 3/2007 | Hirabayashi et al. | 345/661 |
| 2010/0053438 A1* | 3/2010 | Kumamoto | 348/569 |
| 2011/0285971 A1 | 11/2011 | Oka | |

FOREIGN PATENT DOCUMENTS

| | | |
|---|---|---|
| JP | 2002-55669 A | 2/2002 |
| JP | 2003-198994 A | 7/2003 |
| JP | 3826659 B2 | 9/2006 |

\* cited by examiner

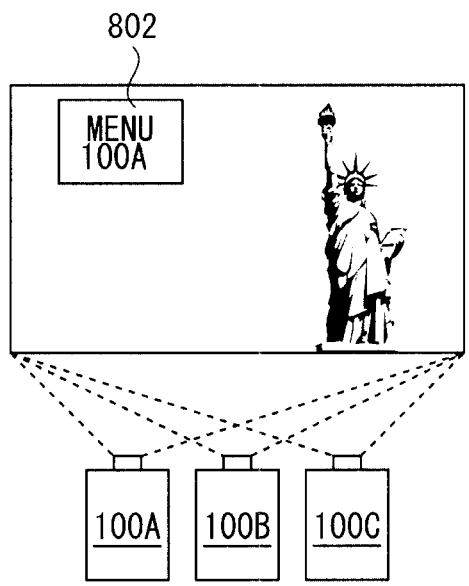
FIG. 8A
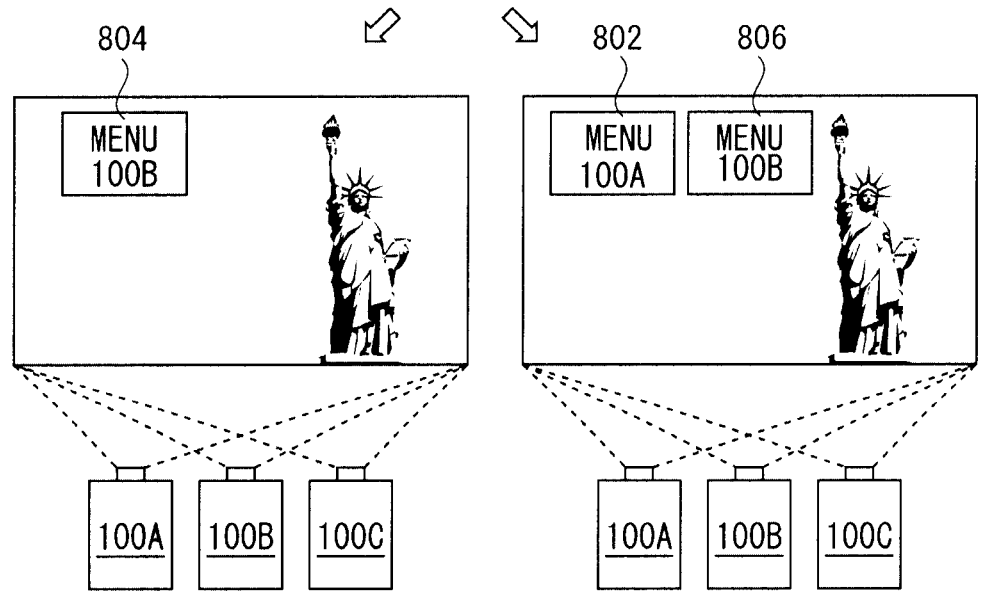
FIG. 8B
FIG. 8C

FIG. 11

| OVERALL ADJUSTMENT MENU | | | |
|---|---|---|---|
|  | PJ100A | PJ100B | PJ100C |
| LUMINANCE | +10 | +10 | +10 |
| CONTRAST | +6 | +6 | +6 |
| SHARPNESS | -3 | -7 | -3 |
| GAMMA CORRECTION | +10 | +5 | +10 |

PROJECTION SYSTEM

BACKGROUND OF THE INVENTION

1. Field of the Invention

The present invention relates to a projection system.

2. Description of the Related Art

Hitherto, a projection apparatus, i.e., a projector for projecting an image on a screen has widely been commercialized. In addition, a projection system has been known, which displays projection images respectively projected from a plurality of projection apparatuses onto the same position by superimposing the projection images thereonto, for purposes of enhancing luminance of each of the projection images and stereoscopically displaying the projection images utilizing parallax. Many projectors have an on-screen-display (OSD) function of displaying a menu screen on the projection image with a view to displaying or adjusting operating-conditions.

If projection images are projected by a plurality of projectors onto the same projection plane, when a certain projector projects an image including an OSD screen, a projection image projected by another projector is superimposed on the OSD screen with a result of reduction in visibility of the OSD screen. As a countermeasure against this problem, a technique has been discussed. In the technique, when a certain projector projects an image including an OSD screen, another projector changes the projected image so that the image doesn't reduce the visibility of the OSD screen. According to techniques discussed in, e.g., Japanese Patent No. 3826659 and Japanese Patent Application Laid-Open No. 2002-55669, at least within a range in which the OSD screen is displayed, the projected image is blackened. However, conventional techniques have the following problems. More specifically, the luminance of the OSD screen in the displayed image is reduced to be lower than that of the remaining area of the displayed image, so that the displayed image becomes unnatural. In addition, because only a menu projected by a single projection apparatus can basically be displayed, operating-conditions cannot be set while menus projected by other projectors are referred to.

SUMMARY OF THE INVENTION

The present invention is directed to a projection system capable of assuring the visibility of an OSD image without reducing the luminance of projected image.

According to the present invention, a plurality of projectors can project the same OSD image onto the same display position, so that the visibility of the OSD image can be assured without reducing the luminance of the OSD image.

According to an aspect of the present invention, a projection apparatus includes a communication unit configured to communicate with an other projection apparatus; an obtaining unit configured to obtain image data; a projection unit configured to project an image based on the image data obtained by the obtaining unit; a generator configured to generate an on-screen-display (OSD) image; and a controller configured to control the projection unit to project a projection image by superimposing the OSD image onto an image, based on the image data obtained by the obtaining unit, in a stack projection mode in which a projection image of the projection unit and a projection image of the other projection apparatus are projected to be superimposed with each other, and to transmit, to the other projection apparatus, information concerning a position at which the OSD image is superimposed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A through 8C are illustrative diagrams illustrating examples of a projection image projected by the operation illustrated in FIG. 7.

FIG. 11 is a flowchart illustrating an example of an overall adjustment menu.

DESCRIPTION OF THE EMBODIMENTS

Various exemplary embodiments, features, and aspects of the invention will be described in detail below with reference to the drawings.

Figure 1:
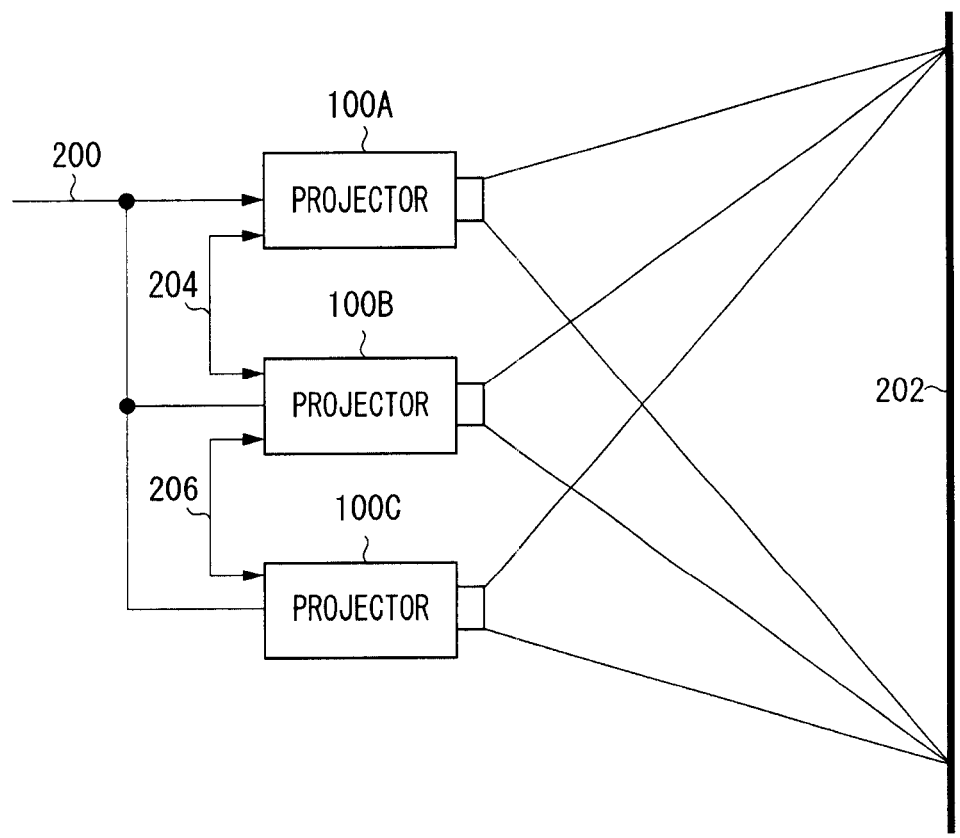
FIG. 1 is a schematic block diagram illustrating a configuration of a projection system according to an exemplary embodiment.

FIG. 1 is a schematic block diagram illustrating a configuration of a first exemplary embodiment of a projection display system. Video signals are supplied from a video signal source (not shown) to three projectors 100A through 100C via a video cable 200. The three projectors 100A through 100C project images on the same region on a screen 202. The projectors 100A through 100C can communicate with one another via communication cables 204 and 206 to exchange information concerning operating-conditions of the projectors 100A through 100C, control signals and image data. Wireless communication can be used instead of the communication cables 204 and 206.

Figure 2:
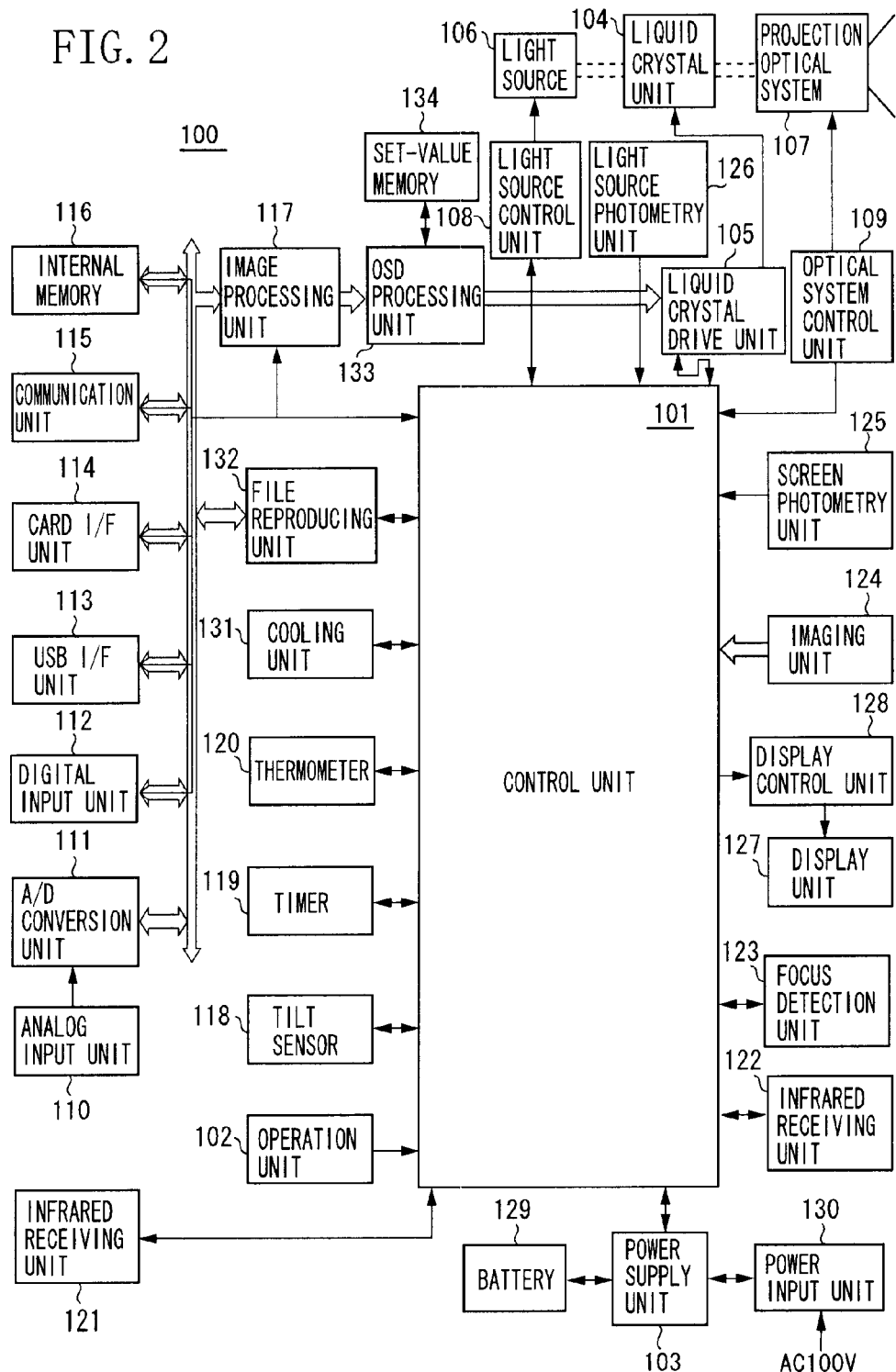
FIG. 2 is a schematic block diagram illustrating a configuration of each projector of the projection system according to the exemplary embodiment.

Each of the projectors 100A through 100C is configured with a projector 100 of the same configuration. FIG. 2 is a schematic block diagram illustrating the projector 100. A control unit 101 controls each block of the projector 100. An operation unit 102 receives an operation performed by a user. A power supply unit 103 controls power supply to each block of the projector 100.

A liquid crystal unit 104 is configured by one or three liquid crystal panels and forms an image on a liquid crystal panel. A liquid crystal drive unit 105 forms an image on the liquid crystal panel of the liquid crystal unit 104, based on an input image signal. A light source 106 illuminates the liquid crystal portion 104 from behind. A projection optical system 107 projects onto a screen (not shown) an optical image obtained by supplying illumination light from the light source 106 to the liquid crystal unit 104. A light source control unit 108 controls a light quantity of the light source 106. An optical system control unit 109 controls operations of a zoom lens, a focus lens of the projection optical system 107, and adjusts a zoom magnification ratio and a focus thereof.

An analog input unit 110 receives analog video signals from a video source, such as a personal computer (PC), a digital versatile disc (DVD), or a television tuner, and has a red, green and blue (RGB) terminals, a separate terminal (S-terminal), or the like. An analog-to-digital (A/D) conversion unit 111 converts an analog video signal input from the analog input unit 110 to a digital signal. A digital input unit 112 receives digital video signals from the video source, and has a high-definition multimedia interface (HDMI) terminal, and the like. Sometimes, digital video signals are transmitted to the HDMI terminal, together with control signals, from outside, so that a video display may be controlled. Video signals and image signals input from the digital input unit 112 are transmitted directly to an image processing unit 117.

A universal serial bus (USB) interface 113 can receive from external devices various information, data, or files, such as video data, image data or video files, and can write various information, data or files into external devices. Pointing devices, a keyboard, a USB type flash memory and the like may be connected to the USB interface 113.

A card interface 114 reads and writes various information data files such as video data, image data and video file or the like from and into a card type recording medium. A communication unit 115 transmits and receives video data, image data, various information data files such as a video file, and the like via an intra-network or the Internet. The communication unit 115 is configured with communication means for a wired local area network (LAN) or those for a wireless LAN. As described below in detail, each of the projectors 100A, 100B, and 100C illustrated in FIG. 1 can exchange control information, OSD data, and set values and control other projectors via the communication unit 115.

An internal memory 116 stores video data, image data, various information data files such as a video file, and the like, and is configured with a semiconductor memory, a hard disk, or the like. For example, a document file input via the card interface 114 is reproduced by a file reproducing unit 132. The file reproducing unit 132 generates an image signal for displaying to a user an image reproduced from a document file, and outputs the generated image signal to the image processing unit 117.

The image processing unit 117 performs correction of image signals obtained by the interfaces 113 and 114 and the file reproducing unit 132 and video signals obtained by the control unit 101 so that the corrected signals are suitable for display on the liquid crystal unit 104. For example, correction is performed so that the number of pixels represented by image signals is converted according to a number of pixels of the liquid crystal panel. The number of frames represented by input video signals is doubled for alternate-current driving of the liquid crystal panel. Thus, correction suitable for image-formation using the liquid crystal panel is performed. Incidentally, the alternate-current driving of the liquid crystal panel is a method for displaying an image on the liquid crystal panel by alternately changing a direction of a voltage applied to a liquid crystal of the liquid crystal panel. This method utilizes the liquid crystal panel's property that an image can be generated by the liquid crystal panel regardless of whether the direction of the voltage applied to the liquid crystal is a forward direction or a reverse direction. At that time, the liquid crystal drive unit 105 needs sending each one of images corresponding to the forward direction and that corresponding to the reverse direction. Thus, the image processing unit 117 performs processing to double the number of frames of video signals. The liquid crystal drive unit 105 forms images on the liquid crystal panel of the liquid crystal unit 104 based on image signals output from the image processing unit 117.

If an image is projected from an oblique direction to the screen, the projection screen is trapezoidally-distorted for example. The image processing unit 117 performs keystone correction to preliminarily deform the shape of the image before projection to eliminate the trapezoidal distortion. When performing the keystone correction, the image processing unit 117 changes an enlargement/reduction rate in a horizontal direction and/or a vertical direction. In other words, the trapezoidal distortion of the projection screen is canceled with a distortion of an image region on the liquid crystal panel. Consequently, a projection image is displayed on the screen to become almost a rectangular image display region of a normal aspect ratio. The keystone correction can automatically be performed, based on a tilt angle obtained by a tilt sensor 118. Alternatively, the keystone correction can be performed by causing a user to operate the operation unit 102.

An OSD processing unit 133 generates an OSD image such as a menu image in response to a request from the control unit 101, and synthesizes the generated OSD image with an image signal sent from the image processing unit 117. The liquid crystal drive unit 105 forms an image on the liquid crystal panel of the liquid crystal unit 104, based on the image signal sent from the OSD processing unit 133. The tilt sensor 118 detects an inclination of the projector 100. A timer 119 detects an operating time of the projector 100 and that of each block. A thermometer 120 measures a temperature of the light source 106 of a projector, that of the liquid crystal unit 104, and an air temperature.

Infrared receiving units 121 and 122 receive infrared light from a remote control attached to the projector 100, and other devices, and send the infrared light to the control unit 101. The infrared receiving units are installed at a plurality of places in an anteroposterior direction of the projector 100 for example. According to the present exemplary embodiment, the infrared receiving unit 121 is placed in the rear of a projector body, while the infrared receiving unit 122 is placed in the front of the projector body.

A focus detection unit 123 detects a focal length by detecting a distance between the projector 100 and a screen (not shown). An imaging unit 124 captures an image in a direction of the screen (not shown). A screen photometry unit 125 measures an amount and luminance of light reflected from the screen. A light source photometry unit 126 measures an amount and luminance of light output from the light source 106.

A display unit 127 is arranged in the projector body of the projector 100 and displays a state of and a warning from the projector 100. A display control unit 128 controls the display unit 127. A battery 129 supplies electric power when the body of the projector 100 is used as portable one. A power input unit 103 receives electric power from an external source and rectifies the electric power to a predetermined voltage and supplies the rectified electric power to the power supply unit 103.

A cooling unit 131 cools the projector 100 by, for example, releasing heat in the projector 100 to the outside. The cooling unit 131 includes, e.g., a heat sink and a fan. A set-value memory 134 stores a set value indicating an operation state of the projector 100. When the operation state of the projector changes, e.g., when a projection image is adjusted by causing a user to operate the operation unit 102 and the like, the control unit 101 writes into a set-value memory 134 information representing the changed operation state.

An operation (i.e., a single projection operation) in the case of using the projector as a single body is described hereinafter. The control unit 101 of the projector 100 controls, in response to a power-on instruction from the operation unit 102, the power source unit 103 to supply electric power to each block of the projector 100. The control unit 101 puts each block into a standby state. After a power supply is turned on, the control unit 101 instructs the light source control unit 108 to cause the light source 106 to output light. Next, the control unit 101 instructs the optical system control unit 109 to adjust a focus of the projection optical system 107 based on focal length information and the like obtained by the focus detection unit 123. The optical system control unit 109 instructs a zoom lens and a focus lens of the projection optical system 107 to operate so that an image of projection light is formed on the screen. Thus, preparations for projection are set.

Video signals input to the digital input unit 112 are converted by the image processing unit 117 into resultant-signals corresponding to a resolution suited to the liquid crystal unit 104. In addition, gamma correction, luminance unevenness countermeasure correction, and the keystone correction are performed on the resultant signals. The liquid crystal drive unit 105 causes the liquid crystal panel of the liquid crystal unit 104 to form, according to the video signal corrected by the image processing unit 117, an associated image thereon. The image formed on the liquid crystal panel of the liquid crystal unit 104 convert s illuminating-light output from the light source 106 into an optical image by performing intensity-modulation. This optical image is projected onto a screen (not shown) by the projection optical system 107. During the projection, the control unit 101 detects temperature of the light source 106 with the thermometer 120. For example, when the temperature of the light source becomes equal to or higher than 40 degrees centigrade, the control unit 101 cools the light source by causing the cooling unit 131 to operate. When a power-off operation is performed at the operation unit 102, the control unit 101 instructs each block to perform termination-processing. When preparation for termination is set, the power supply unit 103 sequentially terminates supply of electric-power to each block. After the power-off, the cooling unit 131 operates a while to cool the projector 100.

Figure 3:
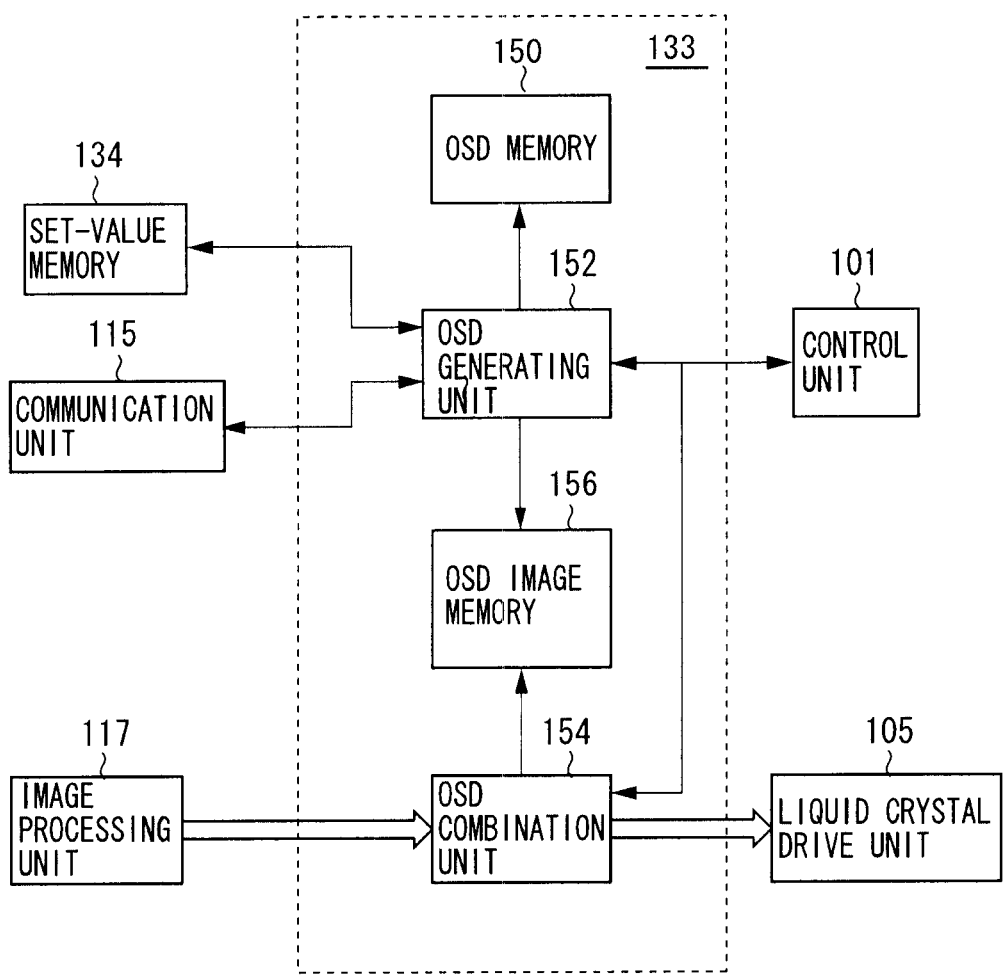
FIG. 3 is a schematic block diagram illustrating a configuration of an OSD processing unit.

Although the operation in the case of displaying video signals input from the digital input unit 112 has been described, an operation performed in the case of displaying video data input from the interfaces 113 and 114 is similar thereto. The functions of the OSD processing unit 133 are described hereinafter. FIG. 3 is a schematic block diagram illustrating a configuration of the OSD processing unit 133. In an OSD memory 150, OSD data, such as graphic data and font data representing an OSD image, is recorded in a predetermined format.

An OSD generating unit 152 reads OSD data and set-value data from the OSD memory 150 and the set-value memory 134, respectively, according to a control signal sent from the control unit 101. Then, the OSD generating unit 152 generates OSD image data and causes the OSD memory 156 to store the generated OSD image. The control unit 101 controls the OSD generating unit 152 to generate OSD image data using the set-value data or the OSD data based on control signals received by the communication unit 115, and to cause an OSD image memory 156 to store the generated OSD image data. In addition, the OSD generating unit 152 can acquire the OSD image from the communication unit 115 and cause the OSD image memory 156 to store the acquired OSD image.

An OSD synthesis unit 154 reads OSD image data from the OSD image memory 156 and synthesizes the OSD image data with a video signal sent from the image processing unit 117. The synthesis of the video signal and the OSD image data in the OSD synthesis unit 154 can be performed in units of pixels using a selector (not shown) provided in the OSD synthesis unit 154. Alternatively, the synthesis of the video signal and the OSD image data can be computed using a multiplier or an adder. Consequently, the OSD image can be displayed in a semi-transparent state.

An operation of displaying a menu by the projector 100A of the projection system illustrated in FIG. 1 is described hereinafter with reference to a flowchart illustrated in FIG. 4. As an example of the operation to be described, it is assumed that the projector 100B stores the same menu data as that stored in the projector 100A, and that the projector 100C does not store the same menu as that stored in the projector 100A. Apparently, when the projector 100B or 100C displays a menu, similar conditions are assumed. Each component of the projectors 100A to 100C is differentiated from components of the other projectors by being designated with reference numeral obtained by adding an associated one of characters A, B, and C to the end of reference numeral which denotes an associated one of functional blocks illustrated in FIG. 2.

In step S401, a control unit 101A of the projector 100A instructs an OSD processing unit 133A to generate a menu image as an OSD image when a menu display request is received by an operation unit 102A or an infrared receiving unit 121A.

In step S402, the OSD processing unit 133A generates a menu image according to a menu image generation instruction. More specifically, an OSD generating unit 152A of the OSD processing unit 133A generates a menu image by acquiring a set-value corresponding to the projector 100A, and menu data from a set-value memory 134A and an OSD memory 150A, respectively.

Next, in step S403, the control unit 101A of the projector 100A acquires menu data of the other projectors 100B and 100C through a communication unit 115A. In the connection configuration illustrated in FIG. 1, the projector 100A communicates with the projector 100C via the projector 100B. The same holds for the following steps.

In step S404, the control unit 101A compares the acquired menu data with the menu data used in step S402. Accordingly, the projector 100A can determine whether each of OSD memories 150B and 150C of the other projectors 100B and 100C stores the same OSD data as the own OSD data. The control unit 101A of the projector 100A determines, based on a result of comparison in step S404, instructions to be given to the other projectors 100B and 100C configuring this system. An OSD memory 150B of the projector 100B stores the same menu data as that used in step S402 by the projector 100A. Thus, the operation proceeds to step S405 from step S404.

In step S405, the control unit 101A of the projector 100A instructs the projector 100B through the communication unit 115A to acquire set-value data from the set-value memory 134A of the projector 100A and to generate a menu image.

In step S406, an OSD generating unit 152B of the projector 100B acquires from the set-value memory 134A set-value data necessary for generating a menu image, and generates the menu image.

In step S407, upon completion of generating the menu image, the OSD generating unit 152B stores the generated menu image data in an OSD image memory 156B, and notifies the projector 100A of completion of preparation for OSD synthesis. In the projector 100C different menu data is stored in an OSD memory 150C. Then, the operation proceeds to step S408 from S404.

In step S408, the control unit 101A of the projector 100A instructs the projector 100C through the communication unit 115A to acquire the menu image corresponding to the projector 100A, which is generated in step S402.

In step S409, in response to this instruction, an OSD generating unit 152C of the projector 100C acquires the menu image corresponding to the projector 100A through a communication unit 115C.

Then, in step S410, the OSD generating unit 152C stores the received menu image in an OSD image memory 156C, and notifies the projector 100A of completion of preparation for OSD synthesis.

In step S411, the projector 100A waits for a notification of completion of preparation for menu image synthesis from all the projectors 100B and 100C configuring the system.

In step S412, when receiving the notifications from all of the other projectors 100B and 100C, the control unit 101A instructs the projectors 100B and 100C through the communication unit 115A to display OSD synthesis position information and the menu image.

In step S413, the projectors 100B and 100C project the same menu image onto the same position as that, onto which the menu image is projected by the projector 100A, on the same screen according to the OSD synthesis position information and a display instruction sent from the projector 100A. More specifically, each of an OSD synthesis unit 154B of the projector 100B and an OSD synthesis unit 154C of the projector 100C synthesizes the OSD data with the video signal sent from an associated one of the image processing units 117B and 117C according to the display instruction issued from the projector 100A, based on the received OSD synthesis position information. Then, the synthesized image is projected on the same screen.

Figure 5B:
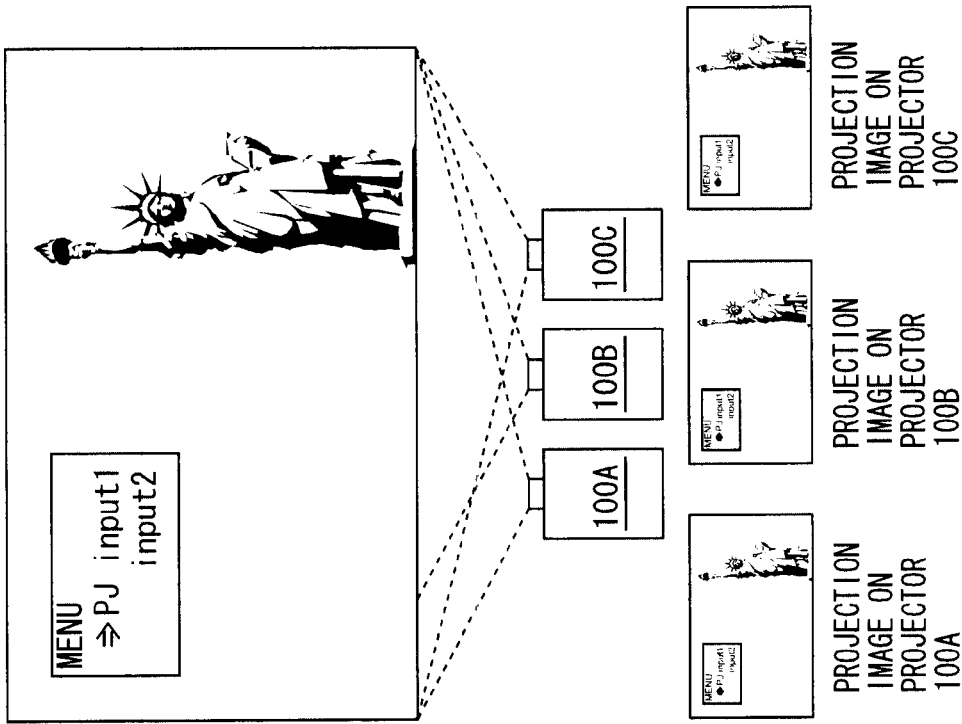
FIGS. 5A and 5B are illustrative diagrams illustrating examples of a projection screen.
Figure 5A:
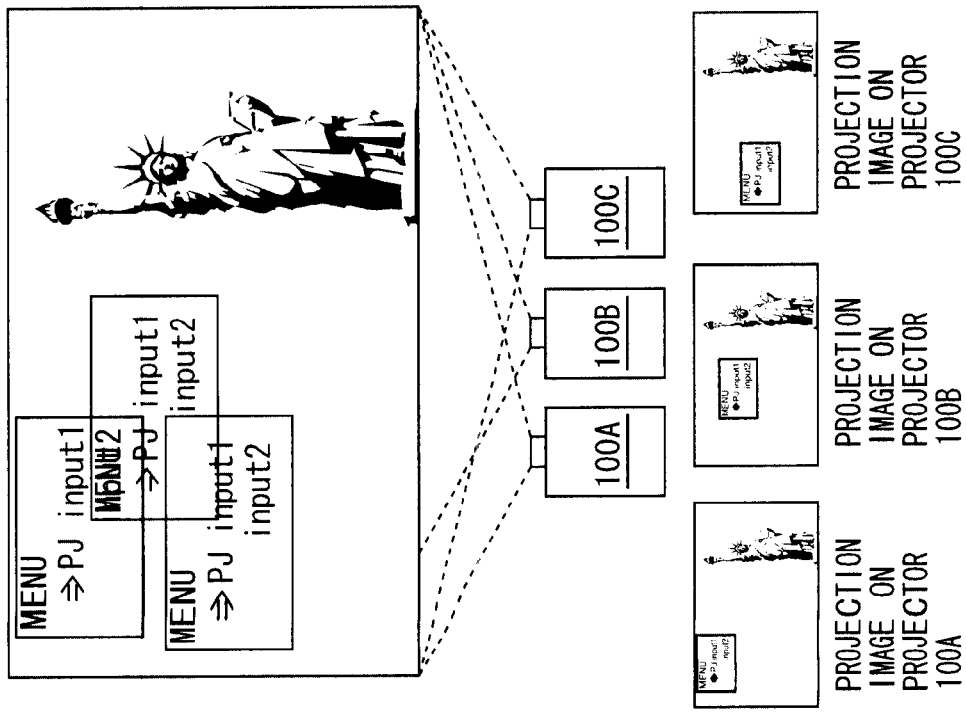

If the projectors 100A through 100C differ from one another in the menu display position, the menu images projected to overlap with one another as illustrated in FIG. 5A are difficult to view. However, according to the present exemplary embodiment, all of the projectors 100A to 100C project menu images onto the same position on the screen. Thus, as illustrated in FIG. 5B, the menu images are clearly displayed.

Thus, according to the present exemplary embodiment, all of the projectors configuring the projection system project the same menu image onto the same position, so that the menu image is easily viewable.

Figure 4:
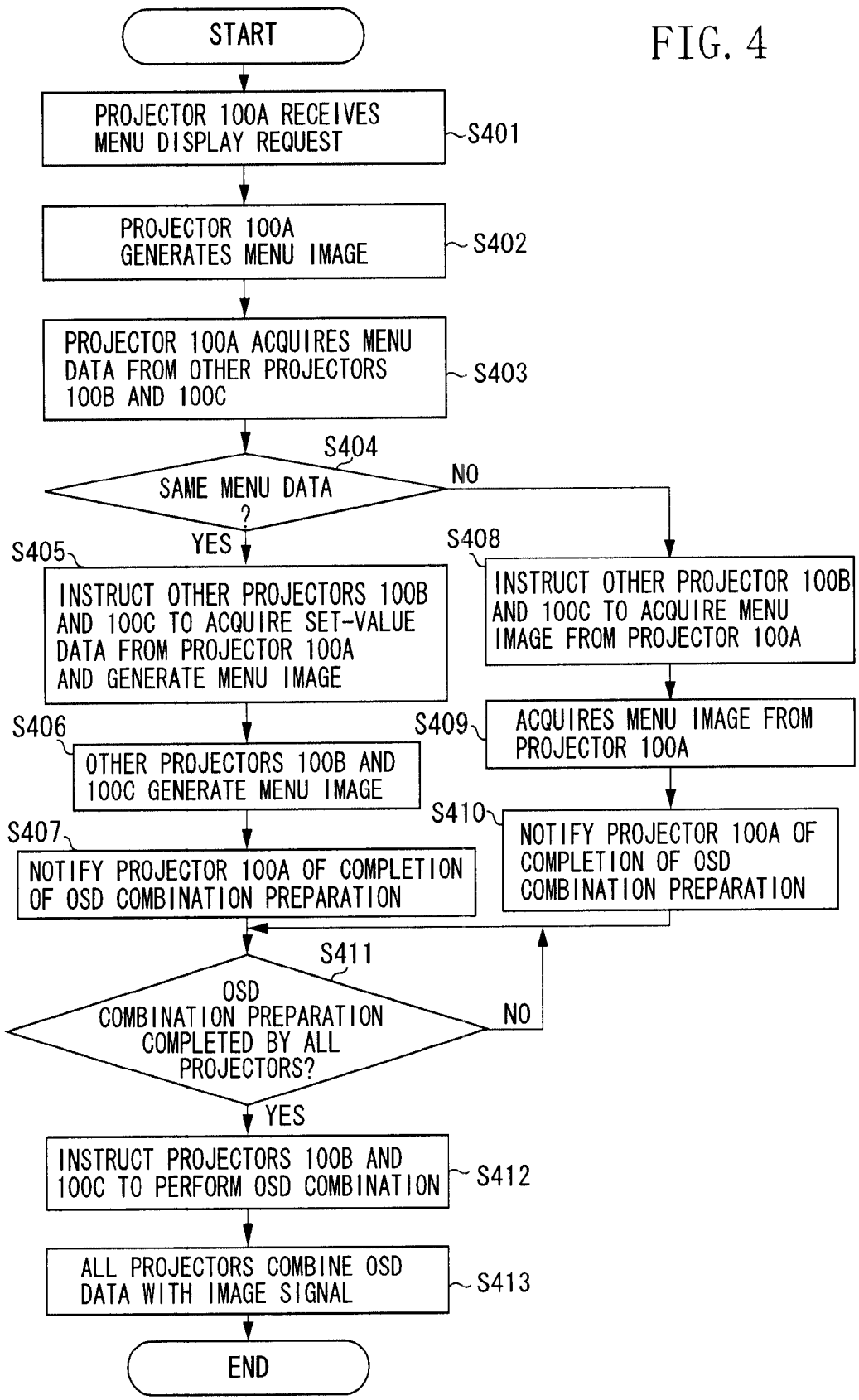
FIG. 4 is a flowchart illustrating an operation of the projection system according to the exemplary embodiment.

According to a flowchart illustrated in FIG. 4, in step S409, the projector 100C acquires the menu image generated by the projector 100A. Alternatively, the projector 100C can generate the same menu image as that generated by the projector 100A. In this case, the projector 100C acquires from the projector 100A the set-value data and the menu data of the projector 100A.

In step S406, the projector 100B generates a menu image based on the set-value of the projector 100A. Alternatively, the menu image of the projector 100A can be acquired by the projector 100B, similarly to that acquired in step S409. Generally, communication of image data imposes a significant load onto communication means. Thus, it takes long time until preparation for menu synthesis is completed. In this respect, it is useful that a menu image is generated by each of the projectors 100B and 100C, similarly to the menu image generation in step S405.

Figure 6:
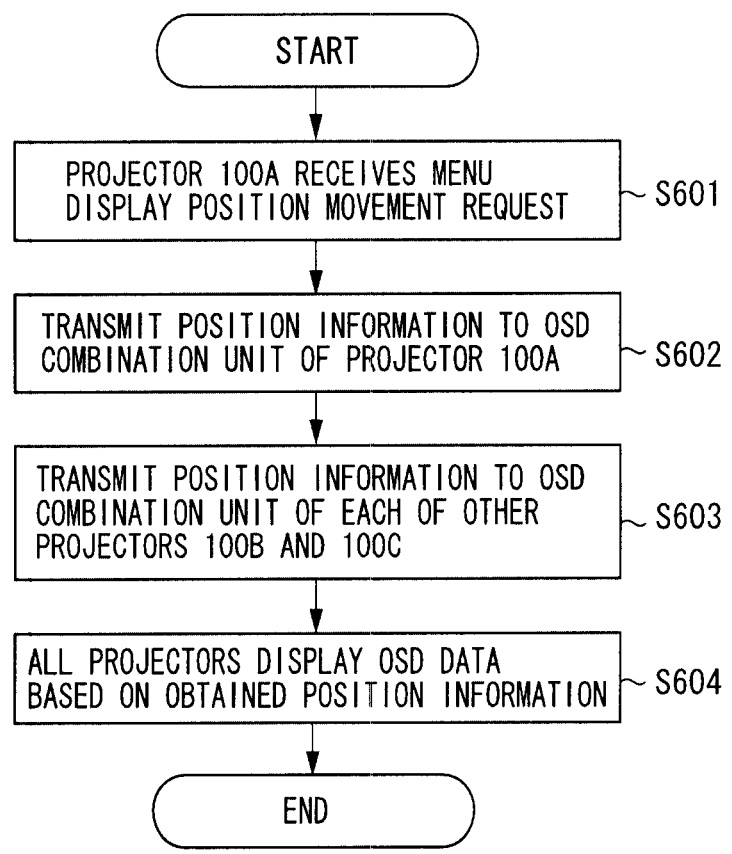
FIG. 6 is a flowchart illustrating a menu control operation.

Hereinafter, an operation of the system, in which the projector 100A is instructed by a user to move a menu-image display position when the projectors 100B and 100C project the same menu image as the menu image corresponding to the projector 100A onto the same position, is described. FIG. 6 is a flowchart illustrating this operation.

In step S601, when the projector 100A receives an instruction to move the menu-image display position, in step S602, the control unit 101A of the projector 100A transmits menu display information to an OSD synthesis unit 154A. Then, in step S603, the control unit 101A transmits similar menu position information to an OSD synthesis unit 154B of the projector 100B and an OSD synthesis unit 154C of the projector 100C through the communication unit 115A.

Figure 7:
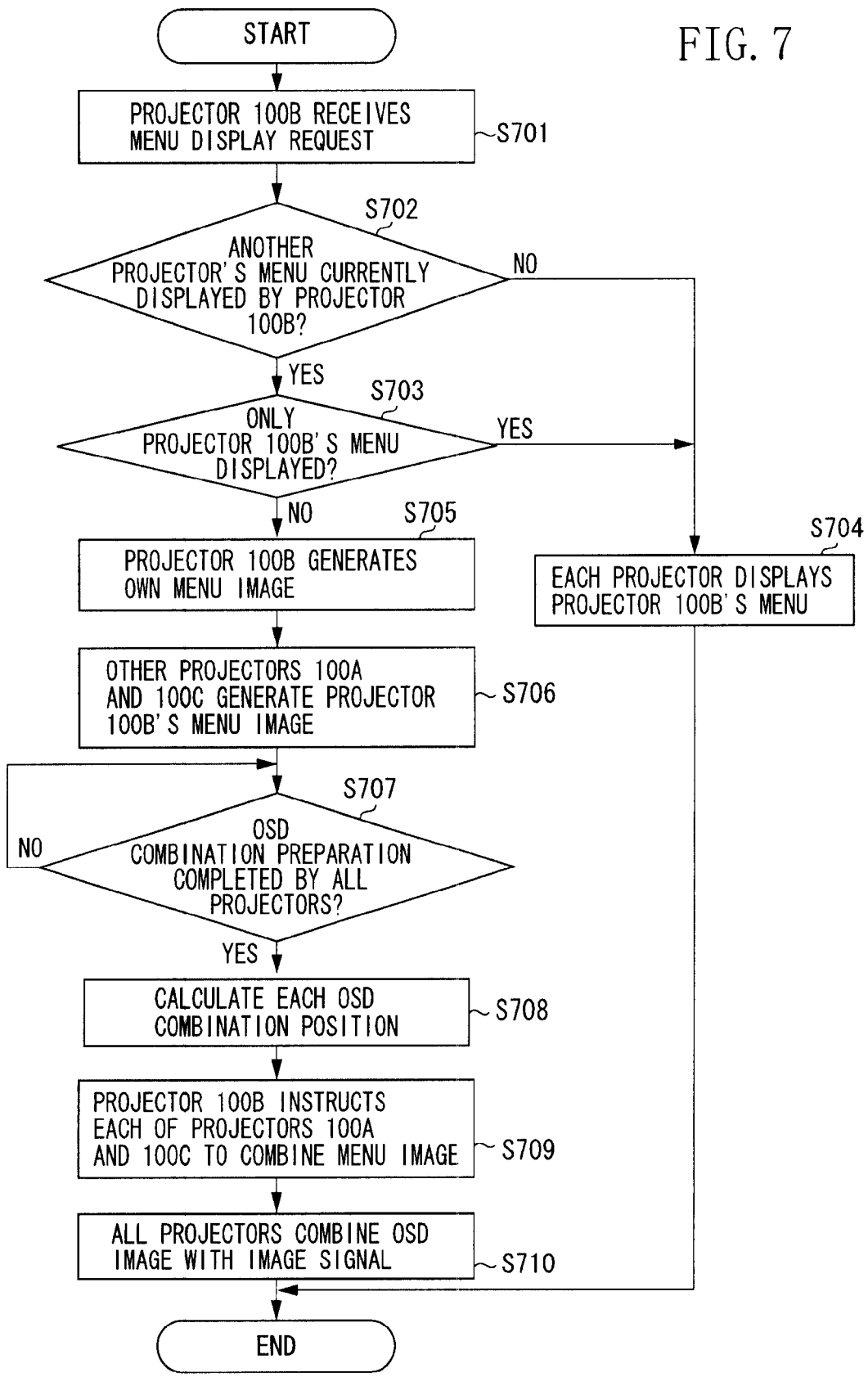
FIG. 7 is a flowchart illustrating another menu display operation.

In step S604, each of the OSD synthesis unit 154A of the projector 100A, the OSD synthesis unit 154B of the projector 100B, and the OSD synthesis unit 154C of the projector 100C synthesizes the menu image with a video signal at a screen position based on the received menu position information. If the user adjusts the menu-image display position corresponding to the projector 100A according to the above flow, each of the other projectors 100B and 100C adjusts the menu-image display position similarly. Consequently, the menu images respectively projected by the projectors 100A, 100B, and 100C are prevented from being displayed at separate positions A second exemplary embodiment is described hereinafter. Two or more of a plurality of projectors 100A, 100B and 100C configuring the projection system can project the menu images onto display-positions at which the menu images do not overlap with one another. An operation of the system, in which the projector 100B projects a menu image onto a position differing from the position of a menu image projected by the projector 100A while the projector 100A projects the menu image, is described hereinafter by way of example. FIG. 7 is a flowchart illustrating this operation. FIGS. 8A through 8C illustrate examples of the displayed menu image.

In step S701, the projector 100B receives a menu display request at the operation unit 102B or an infrared receiving unit 121B. In step S702, a control unit 101B of the projector 100B determines whether the projector 100B currently displays a menu corresponding to another projector.

For example, it is assumed that the projector 100B currently displays a menu image 802 corresponding to another projector, in this case, the projector 100A, as illustrated in FIG. 8A. In this situation, there are two methods for displaying the menu image corresponding to the projector 100B. A first method is to erase the menu image 802 and display a menu image 804 corresponding to the projector 100B, as illustrated in FIG. 8B. A second method is to display a menu image 806 corresponding to the projector 100B at a display position differing from that of the existing menu image 802, as illustrated in FIG. 8C.

In step S703, it is determined according to a preset condition whether only the menu image corresponding to the projector 100B is displayed. Determination can be made in this step according to a condition represented by a control signal received by the operation unit 102B or the infrared receiving unit 121B, which is employed as a branch condition in this step. Alternatively, the determination can be made according to the size of a menu image to be displayed, which is employed as the branch condition. If the latter branch condition is employed, for example, when a ratio of a total area of menu images to be displayed to the area of projected images is equal to or more than a predetermined ratio, the menu image corresponding to the projector 100A is inhibited from being displayed.

If the projector 100B does not display a menu image corresponding to another projector (No in step S702), in step S704, each of the projectors 100A, 100B, and 100C synthesizes the menu image corresponding to the projector 100B with a video signal according to a procedure similar to that including steps S402 to S413. If only the menu image corresponding to the projector 100B is to be displayed (Yes in step S703), processing in step S704 is performed. Alternatively, it is advisable to delete the menu image corresponding to the projector 100A, which is stored in each of the OSD image memories 156A through 156C of the projectors 100A through 100C, and to write thereto the menu image corresponding to the projector 100B.

If both of the menu images corresponding to the projectors 100A and 100B respectively are to be displayed (No in step S703), in step S705, the menu image corresponding to the projector 100B is generated by performing a procedure similar to that in step S402. However, the menu image corresponding to the projector 100A remains stored in the OSD image memory 156B. Accordingly, both of the menu image data corresponding to the projector 100A and that corresponding to the projector 100B are stored in the OSD image memory 156B of the projector 100B. Regarding the projectors 100A and 100C, the menu image corresponding to the projector 100B is generated and stored in the OSD image memories 156A and 156C by following a procedure similar to that including steps S403 through S410. Similarly to the case where the projector 100B performs the processing in step S705, the menu image corresponding to the projector 100A remains stored in the OSD image memories 156A and 156C.

In step S706, the projectors 100A and 100C notify the projector 100B of completion of preparation for OSD synthesis.

In step S707, the projector 100B waits for notifications of completion of preparation for menu-image synthesis from all of the projectors configuring the projection system. In step S708, when receiving the notifications of completion of preparation for menu-image synthesis from all of the projectors configuring the projection system, the control unit 101B of the projector 100B calculates synthesis positions, where each menu image corresponding to the projectors 100A and 100C respectively is displayed, such that the menu images corresponding to the projectors 100A and 100C do not overlap with each other.

Then, in step S709, the projector 100B sends to the projectors 100A and 100C through the communication unit 115B instructions to synthesize the menu image. Each of the instructions includes information representing the positions calculated in step S708, where the menu images corresponding to the projectors 100A and 100C is synthesized with video signals.

In step S710, each of the OSD synthesis unit 154A through 154C of the projectors 100A through 100C reads an associated one of the menu images stored in the OSD image memories 156A through 156C and synthesize the read menu image with video signals at the synthesis position calculated in step S708. According to the above procedures, the menu images corresponding to a plurality of projectors configuring the projection system can simultaneously be projected.

Figure 9:
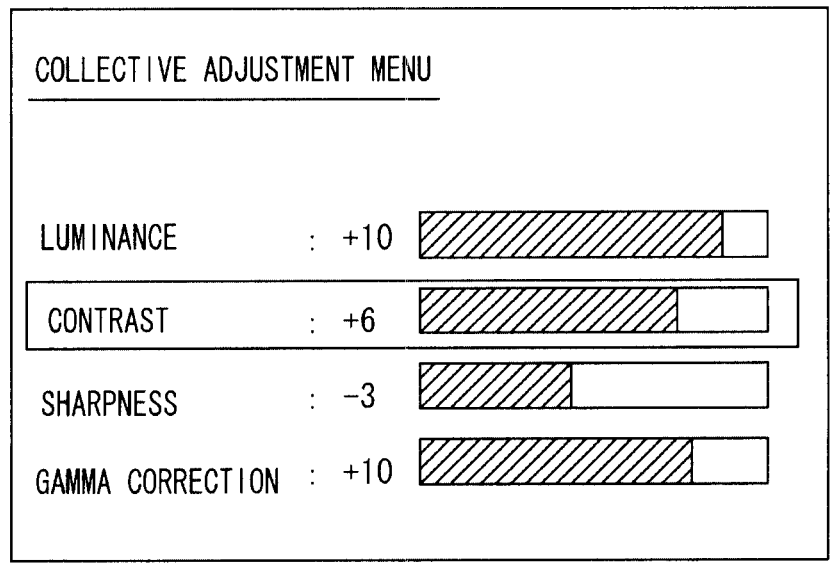
FIG. 9 is an illustrative example illustrating an example of a collective adjustment menu.
Figure 10:
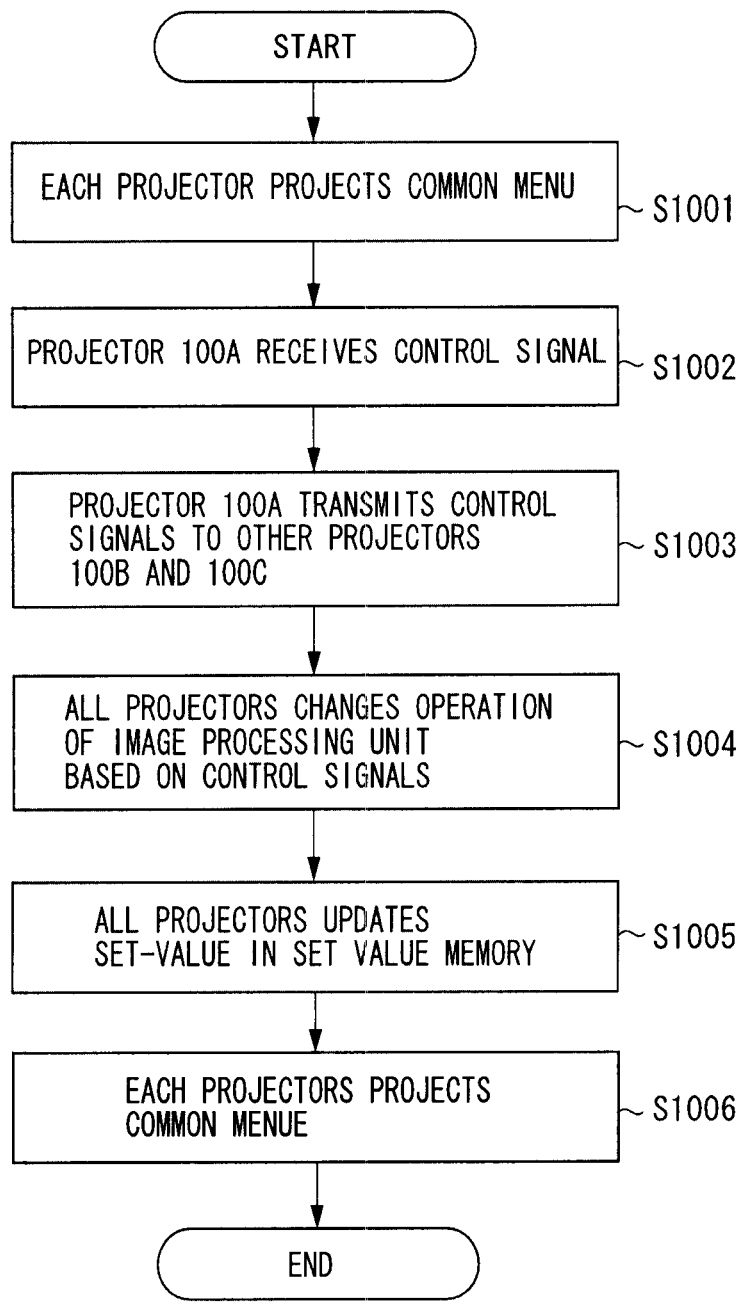
FIG. 10 is a flowchart illustrating an operation of collectively controlling the projectors of the projection system.

A projection system according to a third exemplary embodiment can be configured such that a menu screen for collectively controlling operating-conditions of a plurality of projectors configuring the projection system is generated and projected, and that the operating-conditions of the plurality of projectors are checked and adjusted. FIG. 9 illustrates an example of a menu generated for such an object. FIG. 10 illustrates a flow of such an operation. For example, it is assumed that one of the plurality of projectors configuring the projection system, e.g., the projector 100A generates the menu image illustrated in FIG. 9.

In step S1001, the other projectors 100B and 100C acquire from the projector 100A the menu image corresponding to the projector 100A. All the projectors 100A through 100C synthesize the same menu image with an associated video signal, and projects the synthesized image.

In step S1002, the projector 100A receives a control signal for changing the set value. Then, in step S1003, the control unit 101A sends similar control signals to the projectors 100B and 100C.

In step S1004, each of the control units 101A through 101C of the projectors 100A through 100C instructs an associated one of the image processing units 117A through 117C to change the operation. Then, in step S1005, each of the control units 101A through 101C updates information stored in an associated one of the set-value memories 134A through 134C.

Then, similar to the first exemplary embodiment, when the projector 100A generates a menu image again, each of the other projectors 100B and 100C acquires the menu image from the projector 100A. Then, in step S1006, all the projectors 100A through 100C synthesize the same menu image with an associated video signal and projects the synthesized image.

Targets of the collective change are not limited to the set-value corresponding to image quality. The collective change can be applied to the operating-condition of each projector, e.g., an operation of turning on/off of the power supply for each projector or that of changing input video signals.

A projection system according to a fourth exemplary embodiment can be configured such that a menu screen for displaying operating-conditions of a plurality of projectors configuring the projection system is generated and projected, and that the operating-conditions of the plurality of projectors are checked and adjusted on the menu screen. FIG. 11 illustrates an example of such a menu. A menu image representing such a menu is generated by one (in this case, the projector 100A) of a plurality of projectors configuring the projection system. Then, each of the other projectors 100B and 100C acquires the menu image generated by the projector 100A, and synthesizes the acquired menu image with a video signal and projects the synthesized image. A difference between the present exemplary embodiment and the first exemplary embodiment resides in that the projector 100A acquires set-value data from the set-value memory 134 of each of a plurality of projectors configuring the system and generates a menu image illustrated in FIG. 11.

In the example of the menu, which is illustrated in FIG. 11, the set value corresponding to the projector 100B is selected. In this case, when an operation unit 102A or an infrared receiving unit 121A receive a control signal for changing an operating-condition, the projector 100A transmits the control signal through the communication unit 115A to the control unit 101B of the projector 100B. The control unit 101B of the projector 100B changes the operating-condition of a controlled target according to the received control signal and updates the set value stored in a set-value memory 134B. Thus, a user can change an operation of the projector 100B using the projector 100A.

Then, the projector 100A generates a menu image again. Each of the other projectors 100B and 100C acquires the menu image. The all projectors project the same menu image. The change of the menu display described in each of the first through fourth exemplary embodiments can be implemented according to a control signal received by an associated one of the operation units 102A through 102C or an associated one of the infrared receiving units 121A through 121C of the projectors 100A through 100C.

Other Embodiments

Aspects of the embodiments can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

Each apparatus, including a projection apparatus, may be implemented within, include, or otherwise be connected to a central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs. In an example, a computer-readable medium may store a program that causes a projection apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-121012 filed May 26, 2010, which is hereby incorporated by reference herein in its entirety.

What is claimed is:

1. A projection apparatus, comprising:
   a processor coupled to a memory;
   a combining unit that generates a first combined image which includes a first image and a second image different from the first image;
   a communicator configured to transmit the second image to another projection apparatus, wherein the another projection apparatus is configured to project a second combined image including the second image;
   a controller configured to control the communicator to transmit, to the another projection apparatus, information relating to a position where the second image is combined with the first image; and
   a projector configured to project the first combined image in a mode in which the first combined image and the second combined image are projected to be combined with each other on a screen,
   wherein the combining unit is implemented by the processor.

2. The projection apparatus according to claim 1, wherein the second image is an image used to change a setting of the projection apparatus or an operation of the projection apparatus.

3. The projection apparatus according to claim 1, wherein the communicator is configured to transmit information relating to a setting of the projection apparatus to the another projection apparatus.

4. The projection apparatus according to claim 1, wherein, after the position where the second image is combined with the first image is changed, the controller controls the communicator to transmit, to the another projection apparatus, information relating to a new position where the second image is combined with the first image.

5. The projection apparatus according to claim 1, wherein, in a case where the another projection apparatus combines a third image different from the second image with the second combined image so as not to overlap the second image with the third image, the combining unit also combines the third image with the first combined image so as not to overlap the second image with the third image.

6. The projection apparatus according to claim 1, wherein, in a case where the another projection apparatus combines a third image instead of the second image with the second combined image, the combining unit also combines the third image instead of the second image with the first combined image.

7. The projection apparatus according to claim 1, wherein the second image is an on-screen display (OSD) image.

8. The projection apparatus according to claim 1, wherein the second image is a menu image.

9. The projection apparatus according to claim 1, wherein the second image is a semi-transparent image.

10. The projection apparatus according to claim 1, wherein the second image is an image used to change a setting of the projection apparatus or an operation of the projection apparatus, and is an image used to change a setting of the another projection apparatus or an operations of the another projection apparatus.

11. The projection apparatus according to claim 1, wherein the second image is an image used to inform a user of a setting of the projection apparatus.

12. The projection apparatus according to claim 1, wherein the second image is an image used to inform a user of a setting of the projection apparatus and a setting of the another projection apparatus.

13. The projection apparatus according to claim 1, wherein the projector is configured to project the first combined image by using a liquid crystal panel and a light source.

14. The projection apparatus according to claim 1, wherein the communicator includes a wireless communicator.

15. A method comprising:
   generating a first combined image which includes a first image and a second image different from the first image;
   transmitting the second image to another projection apparatus, wherein the another projection apparatus is configured to project a second combined image including the second image;
   transmitting, to the another projection apparatus, information relating to a position where the second image is combined with the first image; and
   projecting the first combined image in a mode in which the first combined image and the second combined image are projected to be combined with each other on a screen.

16. The method according to claim 15, wherein the second image is an image used to change a setting of the projection apparatus or an operation of the projection apparatus.

17. The method according to claim 15, further comprising transmitting information relating to a setting of the projection apparatus to the another projection apparatus.

18. The method according to claim 15, further comprising after the position where the second image is combined with the first image is changed, transmitting, to the another projection apparatus, information relating to a new position where the second image is combined with the first image.

19. The method according to claim 15, further comprising in a case where the another projection apparatus combines a third image different from the second image with the second combined image so as not to overlap the second image with the third image, combining the third image with the first combined image so as not to overlap the second image with the third image.

20. The method according to claim 15, further comprising in a case where the another projection apparatus combines a third image instead of the second image with the second combined image, combining the third image instead of the second image with the first combined image.

21. The method according to claim 15, wherein the second image is an on-screen display (OSD) image.

22. The method according to claim 15, wherein the second image is a menu image.

23. The method according to claim 15, wherein the second image is a semi-transparent image.

24. The method according to claim 15, wherein the second image is an image used to change a setting of the projection apparatus or an operation of the projection apparatus, and is an image used to change a setting of the another projection apparatus or an operations of the another projection apparatus.

25. The method according to claim 15, wherein the second image is an image used to inform a user of a setting of the projection apparatus.

26. The method according to claim 15, wherein the second image is an image used to inform a user of a setting of the projection apparatus and a setting of the another projection apparatus.

27. A non-transitory storage medium that stores a program for causing a computer to execute a method, the method comprising:
  generating a first combined image which includes a first image and a second image different from the first image;
  transmitting the second image to another projection apparatus, wherein the another projection apparatus is configured to project a second combined image including the second image;
  transmitting, to the another projection apparatus, information relating to a position where the second image is combined with the first image; and
  projecting the first combined image in a mode in which the first combined image and the second combined image are projected to be combined with each other on a screen.

* * * * *